United States Patent [19]

Feild

[11] Patent Number: 5,109,303
[45] Date of Patent: Apr. 28, 1992

[54] APPARATUS FOR ACCURATE TIME ALIGNMENT OF SIGNAL DATA DERIVED FROM MULTIPLE CHANNELS

[75] Inventor: Dirk O. Feild, Camarillo, Calif.
[73] Assignee: Zymed, Camarillo, Calif.
[21] Appl. No.: 450,447
[22] Filed: Dec. 4, 1989
[51] Int. Cl.⁵ .......................................... G11B 20/20
[52] U.S. Cl. ............................................... 360/26
[58] Field of Search ........................................ 360/26
[56] References Cited
U.S. PATENT DOCUMENTS 4,357,702 11/1982 Chase ................................. 360/26 X
4,477,845 10/1984 Mortlock ............................ 360/26
4,533,964 8/1985 Owaki ................................ 360/26 X Primary Examiner—A. J. Heinz
Attorney, Agent, or Firm—Roger A. Marrs

[57] ABSTRACT

Apparatus is disclosed for adding a calibration signal with known phase-timing relationships to identify a time of onset for each input channel being monitored separately. A signal generator produces alignment signals which are introduced to a switch network in parallel with input channel signals requiring phase alignment. The signals are amplified and recorded on a tape including phase shifts and/or time delays. During playback from the tape, playback devices sense the amplified input channel signals utilizing the phase shift and/or time delay information to subsequently adjust these signals for review and analysis.

1 Claim, 2 Drawing Sheets

APPARATUS FOR ACCURATE TIME ALIGNMENT OF SIGNAL DATA DERIVED FROM MULTIPLE CHANNELS

BACKGROUND OF THE INVENTION

1. Field of the Invention

The present invention relates to the field of multichannel recording systems and more particularly to a novel apparatus for generating accurate calibration signals in alignment with signal data supplied from multiple channel sources in order to eliminate measurable time shifts between recorded and playback data.

2. Brief Description of the Prior Art

In the utilization of multichannel recording systems, problems and difficulties have existed which reside in connection with problems of fine time domain adjustment. There are numerous physical and electrical phenomena that cause the playback of previously recorded signals to be out of phase from the original signal. As the speeds of recording are reduced with respect to the recorded frequencies, this can manifest itself as a measurable time shift. There are numerous physical measurements that can be corrupted by such time shifts.

As an example, in the measurement of physiological signals, the relationship of pacemaker activity to other measured quantities is critical and the reproducing of original signals from the pacemaker must be identical and include no misalignment or time shift variation. Furthermore, in the combining of multiple signal channels into a synthesized signal, time shifts can greatly distort or render the resulting signal meaningless. Any physiological system where measurement locations in one channel are extended to other channels, proper alignment of the signal information between the two channels is critical, such as in ST segment analysis. Additionally, it is often desirable to synchronize the signals whenever the signals are viewed or displayed so as to prevent errors in interpretation.

Therefore, a long standing need has existed to provide an accurate time alignment between signal data derived from multiple recording channels. Prerecorded signals from multiple channels must be synchronized in both amplitude and time so that all channel data is in "phase" alignment, such as vertical alignment of signal pulses between a plurality of inputting channels.

SUMMARY OF THE INVENTION

Accordingly, the above problems and difficulties are obviated by the present invention which provides a novel means for generating a calibration signal for inclusion and synchronization with data signals derived from multichannel recording inputs so that resultant playback data signals are free of distortion, corruption and misalignment. In one form of the invention, a synchronizing alignment signal generator is operably connected to a switching network in parallel with a plurality of input signals taken from physical measurements, for example, such as pacemaker and electrocardiogram signals or the like. A signal calibration control means is also connected to the switch network to select between the synchronizing alignment signal generator and the multiple channel input signal detectors whereby a resultant signal data is outputted through an amplifying circuit to the recording heads for recording onto a tape. The invention further includes a playback means for deriving the recorded information from the tape and processing the information so that the original input signal data is available for display in alignment and in phase.

Therefore, it is among the objects of the present invention to provide a novel apparatus for accurate time alignment of signal data derived from multiple channels wherein the means includes a generator for adding a calibration signal with known phase timing relationships to identify a time of onset for each channel separately whereby after the phase shifts and/or time delays have been recorded for alignment purposes, this information is subsequently used to adjust signals during playback, review and analysis.

Another object of the present invention is to provide a novel means in a multichannel recording system for eliminating the misalignment of multichannel information from the misalignment of recording heads or because of tape skewing or tape misalignment.

Another object of the present invention is to provide a novel means for placing a signal time and amplitude calibration initially at the beginning of a multiple channel recording which is followed by random spaced intervals along the length of the recording tape.

Yet another object of the present invention is to provide a novel means for aligning data from a multiple channel input whereby numerous physical measurements reflected in data signal information are void of corruption due to the presence of time shifts or the like.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
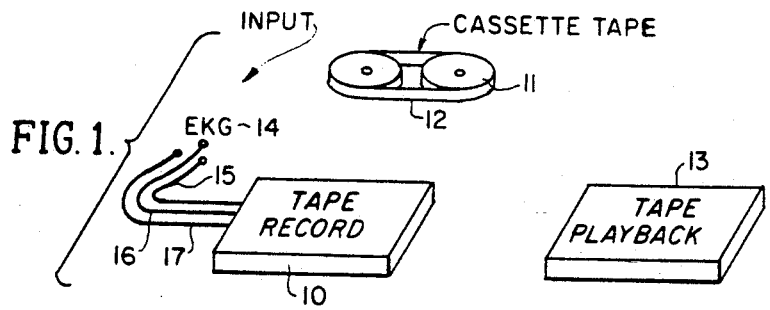
FIG. 1 is a diagrammatic illustration showing an overall use of the present invention.

Referring to FIG. 1, a typical multichannel recording system is illustrated having a tape recorder 10 for insertably receiving a conventional cassette 11 having a tape 12 for carrying recorded information. The tape is initially placed into the recorder 10 and subsequently removed for insertion into a tape playback unit 13 which reproduces the signals carried on the tape by way of audio reproduction, visual display on a CRT tube or graphic representation on an analyzing unit or the like. Signals placed on the tape 12 are derived from sensors (such as conventional EKG electrodes 14) which are suitably connected to the tape recorder via channel inputs 15 and 16.

During a typical tape recording procedure, misalignment of recording heads sometimes misaligns the signals as applied to the tape so that discrepancies will appear when played back. Also, the problem exists on account of skewing of the tape during the taping procedure which again may cause misalignment of information between channels carried on the tape. Such misalignment may cause corruption or distortion of the output information which is intolerable in multidata channel systems carrying EKG signals or other physiological data such as temperature or the like that requires alignment in terms of time. Therefore, the inventive concept includes a circuit addition for accurate time alignment of signal data derived from multiple data channels that is incorporated into a tape recorder having a magnetic recording tape for signal data storage. The circuit of the present invention includes a prerecording alignment signal means for both amplitude and time applicable to all channels such that "phase" alignment of the signals is achieved, such as vertical alignment of signal pulses between adjacent recorded input channels. The inventive circuit places signal time and amplitude calibration initially at the beginning of time followed by random spaced interval along the length of the recording. Therefore, not only are the calibrated alignment signals synchronized with the input channel signal data at the time of initial recording but periodically along the length of the recording as a means for assuring alignment of the channel signals.

Figure 2:
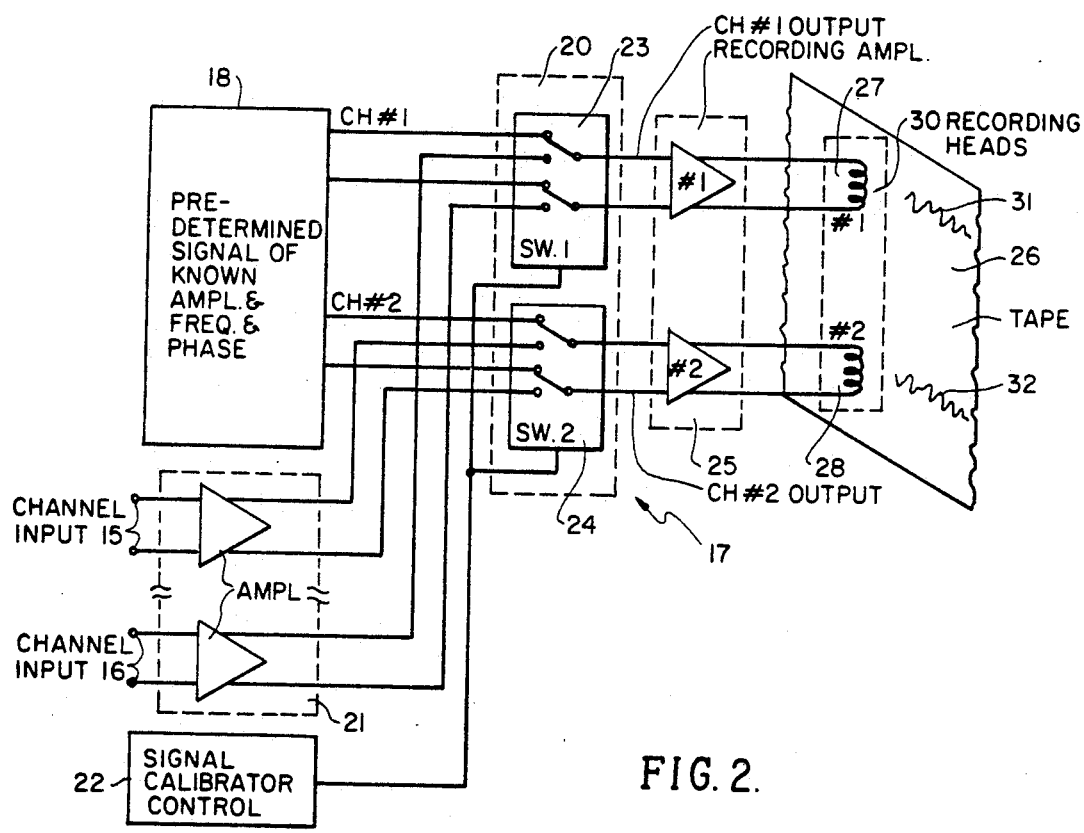
FIG. 2 is a block diagram of the novel signal alignment means employed in the inventive concept.

Referring now in detail to FIG. 2, the inventive alignment and calibration circuit of the present invention is indicated in the general direction of arrow 17 which includes a synchronizing alignment signal generator 18 for generating predetermined signals of known amplitude and frequency components of each channel for outputting on leads indicated as channel 1 output and channel 2 output connected with switch network 20. Also connected to switch network 20 in parallel with the channel 1 and channel 2 signal leads are leads outputting from an input signal amplifier circuit 21. Signals sensed or detected by the sensing unit 14 are coupled to the circuit 21 via the channel inputs 15 and 16. It is to be understood that for illustrative purposes, only a pair of channels is illustrated; however, the present inventive concept is applicable to a multichannel recording system having far more inputs than the channel inputs 15 and 16 illustrated. A signal calibrator control 22 is connected to switch network 20 for supplying control signals operating the switch at a fixed time so that the switches indicated by numerals 23 and 24 are synchronous. During normal recording, the switches 23 and 24 will be aligned with switch contacts permitting the input channel information from channels 15 and 16 to be processed through a recording amplifier circuit 25 for processing directly onto a magnetic tape 26 via recording heads 27 and 28 indicated within the broken-lined box 30. The channel information carried on the tape is indicated by recorded data 31 and recorded data 32.

The switching network 20 is employed for placing calibration signals derived from the generator 18 on the recording tape 26 at an initial recording time period and at any subsequent time period required along the length of the recording. The energization or application of the calibrated signal is under control of signal calibrator control 22 when switched by the switches 23 and 24 to interrupt recording of the input channel data carried on the input channels 15 and 16. This latter data is in the form of electrical signals derived from physiological data, such as EKG potential or pacemakers, detected or sensed by devices 14, such as EKG electrodes or the like.

Figure 3:
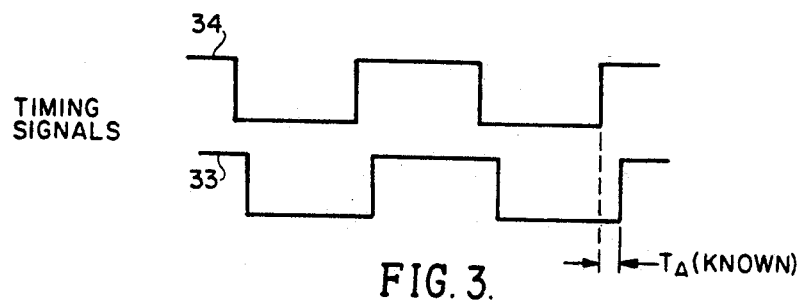
FIG. 3 is a graph illustrating tiny signals employed in the record process.

Timing signals are shown in FIG. 3 wherein the calibration signal is created by calibrator 18 controlling the phase of square wave pulses along train 33 and train 34 so that a known phase relationship is established as indicated by T delta indicated between the arrows.

Figure 4:
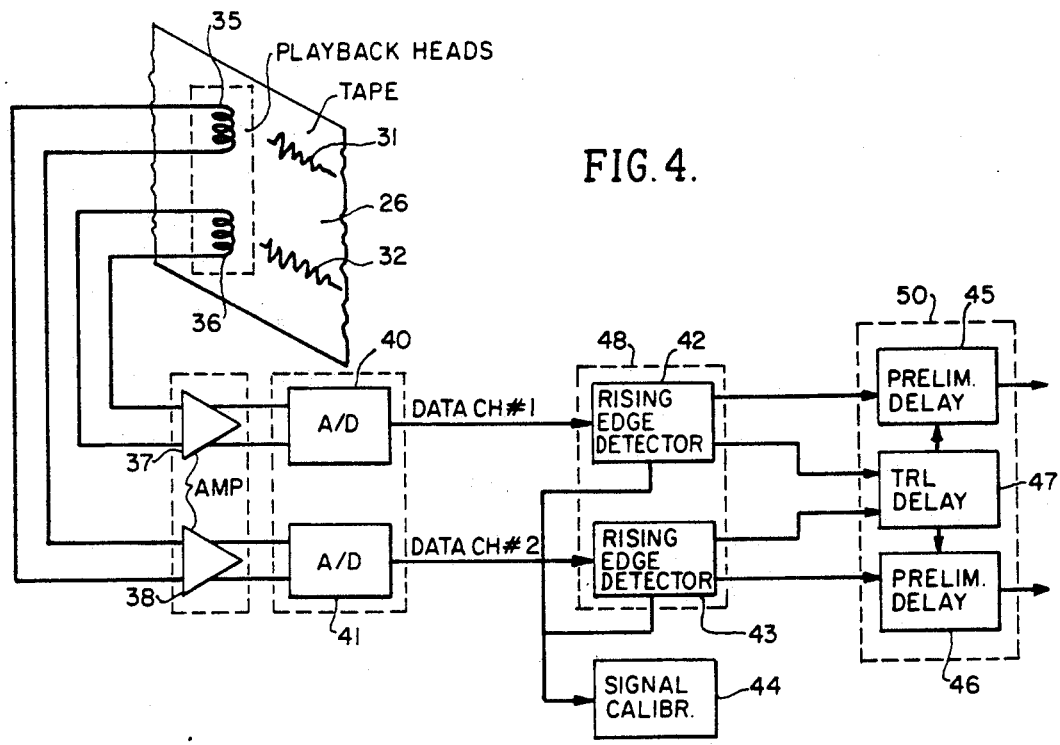
FIG. 4 is a block diagram illustrating the circuit for playback of the recorded information in synchronization.
Figure 5:
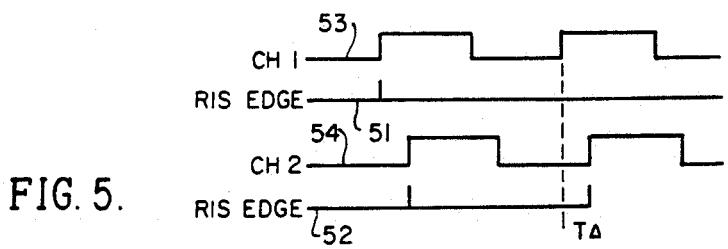
FIG. 5 is a waveform comparison of signal information during the playback operation.

Referring now in detail to FIG. 4, it can be seen that the inventive concept further includes means in the playback unit for deriving the synchronized channel data information from tape 26 as carried on tracks 31 and 32 respectively. In order to derive the data, playback heads 35 and 36 electromagnetically pick up these signals for processing through amplifiers 37 and 38 to A/D circuits 40 and 41 respectively; a data stream of signals is carried on channel line 1 while other data signals are carried on the channel line 2. These signals are introduced to a rising edge detector circuit for each channel represented by numerals 42 and 43 where timing signals from a signal calibrator 44 are also synchronized. The wave shapes detected by the detectors 42 and 43 are illustrated in FIG. 5 from the respective channels 1 and 2 data so that a secondary phase pulse is generated indicated by T' delta. Next, the information is processed to delay circuits 45 and 46 which are synchronized with the signals derived from the detectors by means of delay circuit 47. The output of the preliminary delays 45 and 46 output data which are corrected signals compensating for playback head misalignment and also for tape skewing. The rising edge detectors are indicated in a broken line block by numeral 48 while the time delay circuits are indicated within the broken line block 50.

In FIG. 5, the rising edge detection pulses are illustrated with respect to channel 1 data on line 51 while the same data associated with channel 2 is indicated on line 52. The channel 1 information is carried on line 53, while 54 indicates the channel 2 information.

Figure 6:
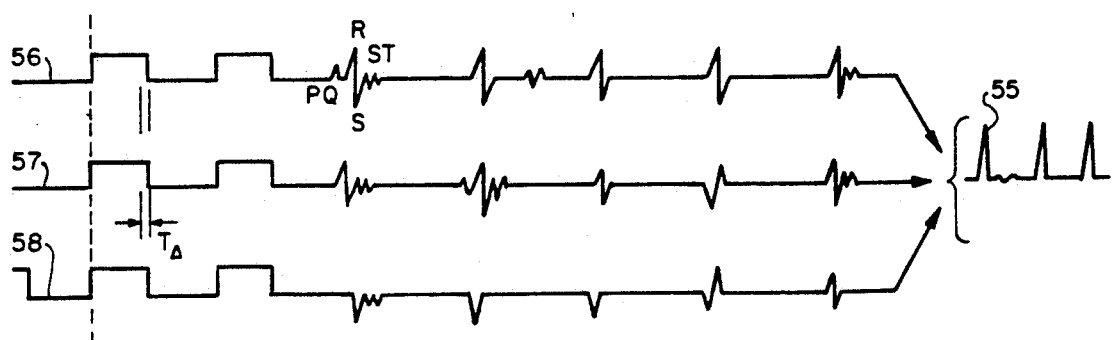
FIG. 6 is a waveform diagram illustrating the time calibration signals in the form of a series of pulses derived from synchronization of multiple channel inputs.

FIG. 6 is a graph diagram showing synchronization of signals to produce a composite signal, such as is indicated by numeral 55. Physiological data information is provided by pulses on graph lines 56, 57 and 58 representing channels 1, 2 and 3.

Alignment channel data signals are needed before entering calculations during analysis of data. Switch or signal calibrator 44 controls the acquisition of the alignment data signals to introduce delay for automatic or simultaneous alignment. When calibrator 44 is on, the phase relationship between the pulse trains on data channel 1 and 2 (FIG. 4) which were originally produced on the tape by the signal calibrator 18 (FIG. 2) is established. The new phase $T_{66}$ (FIG. 5) is compared to the original, known phase skew, $T_A$ (FIG. 3) and used to derive delay value for the delay 47 (FIG. 4). When calibrator 44 is off the physiological data derived from channel input and channel 2 input (15 and 16 FIG. 1) is processed by phase delay circuits 45 and 46 (FIG. 4) to restore the original, known phase $T_A$ before being stored in memory. This eliminates all phase errors introduced between the recording amplifier (25, FIG. 2) and the converters (40, 41 FIG. 4) including either recording or playback tape head misalignment.

In view of the foregoing, it can be seen that the circuitry of the present invention included in both the recorder and the playback units will adequately eliminate problems dealing with head misalignment and skewing of the tape in that means are provided for generating calibration signals with respect to time and phase so that the playback information is identical with respect to time and phase as the originally recorded information. Therefore, distortion and other corruption of the original physiological recorded data is eliminated.

FIG. 6 illustrates the combining of three channel signals together to obtain a single synchronized signal together. The three signals may represent different indications of heart data for reconstruction to view the heart status from any angle. The signals must be aligned in time to get a composite view.

Time accuracy also allows for the finding of small signals occurring simultaneously in two or more signals. Known unwanted signal shapes are subtracted out by gating and the residuals processed to enhance each other from the two or more signal channels. Therefore, the present invention electronically aligns multiple signal data that may have been mechanically misaligned.

While particular embodiments of the present invention have been shown and described, it will be obvious to those skilled in the art that change and modifications may be made without departing from this invention in its broader aspects and, therefore, the aim in the appended claims is to cover all such changes and modifications as fall within the true spirit and scope of this invention.

What is claimed is:

1. In a multichannel recording system having a recording unit and a playback unit, the improvement which comprises:
    means in said recording unit for receiving data via multiple channel inputs;
    means in said recording unit for generating alignment signals for synchronization with said multiple channel input data;
    a switch network operably connected to said multiple channel input means and said alignment signal means for outputting said alignment signals in time/phase with said multiple channel input data;
    means in said playback unit including waveform rising edge detectors and time delay means for compensating for misalignment of alignment signals;
    a signal calibration circuit coupled to said switch network for adding an alignment signal from said alignment signal means to said multiple channel data according to a time and phase sequence;
    said compensating means electronically compensates for mechanical misalignment such as derived from playback head misalignment or tape skew;
    said alignment signal is a composite signal derived from at least two channel data signals aligned in time relationship; and
    said two channel data signals are combined together to obtain a synchronized signal in time relationship to establish said composite alignment signal.

* * * * *